United States Patent [19]

Blaimschein

[11] Patent Number: 4,884,210

[45] Date of Patent: Nov. 28, 1989

[54] METHOD AND MACHINE FOR A BALANCING CENTERING OF WORKPIECES WHICH ARE TO BE MACHINED ONLY AT CERTAIN PORTIONS, PARTICULARLY CRANKSHAFTS

[75] Inventor: Gottfried Blaimschein, Steyr, Austria

[73] Assignee: GFM Gesellschaft für Fertigungstechnik und Maschinenbau Gesellschaft m.b.H., Steyr, Austria

[21] Appl. No.: 121,124

[22] Filed: Nov. 16, 1987

[30] Foreign Application Priority Data

Nov. 26, 1986 [EP] European Pat. Off. ........ 86890329.5

[51] Int. Cl.⁴ ..................... G01M 1/24; G01M 1/02; B23B 49/04
[52] U.S. Cl. .................. 364/474.01; 364/474.17; 408/2; 51/165.71
[58] Field of Search ............ 364/474.01, 474.02, 364/474.06, 474.17; 408/2; 51/165.75, 237 R, 165.71

[56] References Cited

U.S. PATENT DOCUMENTS

| | | | |
|---|---|---|---|
| 3,861,817 | 1/1975 | Muller | 408/2 |
| 3,891,835 | 6/1975 | Shoda et al. | 364/474.17 |
| 3,932,053 | 1/1976 | Hack | 408/2 |
| 3,934,963 | 1/1976 | Langlois | 408/2 |
| 4,667,445 | 5/1987 | Kimura | 51/131.1 |
| 4,700,439 | 10/1987 | Hines | 29/33 T |
| 4,790,697 | 12/1988 | Hines et al. | 408/2 |

*Primary Examiner*—Allen MacDonald
*Attorney, Agent, or Firm*—Kurt Kelman

[57] ABSTRACT

In a method and machine for balancing centering a workpiece, such as a crankshaft, to be machined only at certain portions and in which the workpiece is transversely displaced with respect to an axis of rotation so as to minimize any unbalance and is subsequently cut to length, after which centering bores are formed in the opposite end faces of the workpiece to define the axis of rotation, the final balancing after the finishing machining of the workpiece is optimized by pre-balancing the workpiece in a manner which takes into account only the unbalance of those workpiece portions which will not be machined to determine the extent and direction of the transverse displacement.

5 Claims, 1 Drawing Sheet

METHOD AND MACHINE FOR A BALANCING CENTERING OF WORKPIECES WHICH ARE TO BE MACHINED ONLY AT CERTAIN PORTIONS, PARTICULARLY CRANKSHAFTS

BACKGROUND OF THE INVENTION

1. Field of the Invention

This invention relates to a method for a balancing centering of workpieces which are to be machined only at certain portions, particularly crankshafts, wherein the workpiece is displaced transversely to its axis of rotation so as to reduce the unbalance before the workpiece is machined, and the workpiece is subsequently cut to length and is formed in its end faces with centering bores which define a center line and an axis of rotation, of a balanced workpiece. The invention relates also to a machine for carrying out that method.

2. Description of the Prior Art

Owing to the steady progress which has been achieved in forging and foundry technology, even workpieces used as rotating parts of machines, such as crankshafts and camshafts, need no longer be finished by a machining of all portions of the rough workpiece in an as-cast or as-forged state. It is often sufficient to machine the workpiece only at its bearing and sliding surfaces and possibly at surfaces at which the workpiece is to be clamped and engaged for alignment and at other critical surface portions so that the manufacture of the workpiece will be more economical. But it is still necessary to balance the workpiece in a final operation, in which considerable difficulties will arise if the masses are not properly distributed. For a mass balancing, material must be removed from the workpiece by drilling or boring and a satisfactory balancing may not be accomplished in extreme cases, in which an adequate mass cannot be removed from the workpiece by drilling or boring. In order to simplify that final balancing, it has been suggested to perform a preliminary centering and balancing of the workpieces before they are machined. In that case the workpiece is displaced transversely to its ideal geometrical axis of rotation in dependence on the unbalance which has been detected and when the workp8iece is in a corrected position the centering bores are formed so as to define the new position of the center line and the axis of rotation of the workpiece so that the initially present unbalances are compensated. In the previous practice, the entire mass of the workpiece and the mass distribution of the entire workpiece was taken into consideration and formed the basis for determining the balancing centering, and a dynamic balancing of the workpiece has been effected although this is a complicated operation and does not produce satisfactory results as the subsequent machining of parts of the workpiece will change the masses and the mass distribution so that the final balancing of the finished workpiece is hardly simplified.

SUMMARY OF THE INVENTION

It is a first object of the invention to eliminate said disadvantages and so to improve a method of the kind described first hereinbefore that the workpiece can be satisfactorily and economically balanced in the course of its manufacture.

It is a second object of the invention to provide a machine which is particularly suitable for carrying out a method by which the first object can be accomplished.

The first object is accomplished in accordance with the invention by a method in which the unbalances which are due to the workpiece portions which are to be machined are disregarded and only those workpiece portions which will not be machined are taken into account in the determination of the workpiece. After that transverse displacement, the axis of rotation which is defined by the centering bores will provide a balance only with respect to those portions of the workpiece which will remain unmachined so that said preliminary balancing will result in an optimum initial condition for the final balancing to be performed when the workpiece has been machined. This is due to the fact that the workpiece is machined with respect to the axis of rotation which is defined by the centering bores and said machining will eliminate unbalances of the machined portions so that the resulting predetermined balanced mass distribution will be obtained with respect to the axis of rotation as is called for by the design of the workpiece. As a result the final balancing may be restricted to a precision balancing, which can be economically performed and even with workpieces having unmachined portions will ensure a perfectly balanced, true running about the defined axis of rotation.

In a preferred embodiment of the invention the actual external shapes of those portions of the workpiece will not be machined are measured, said actual shapes are entered into a computer, in which said actual shapes are compared with the desired shapes of an ideal workpiece, and the transverse displacement of the workpiece is computed by said computer in dependence on any detected deviation between the actual and desired shapes and within the limits defined by the specified over-measures of material. With the aid of such computer, an automatic balancing can quickly be accomplished without a need for a movement of the workpiece to detect any unbalances. If the actual shapes of certain workpiece portions are compared in the computer with the desired shapes stored in the computer, the required displacement of the workpiece can be determined without a need for an additional structural and mechanical expenditure and said displacement of the material will be within the limits which are defined by the overmeasures of material and will ensure that the workpiece can subsequently be machined as required. By a suitable programming of the computer the theoretical and practical experiences gained in the centering and balancing of the workpieces can be taken into account. Particularly in mass production, that practice may simplify the comparison of the actual and desired shapes.

It may also be desirable within the scope of the invention to measure only the location of selected individual points of reference and to determine the required displacement of the workpiece in consideration of the measured values thus obtained. Those portions of the workpiece at which deviations in the mass distribution often occur are known from experience and the balancing centering will always be succeeded after the machining of the workpiece by a precision balancing, by which any faults of the preliminary balancing will be eliminated. For this reason it will be sufficient to adopt methods of approximation and properly programmed computers can be used to determine on the basis of the locations of the points of reference merely by computation that position of the axis of rotation which will be most favorable in view of the existing mass distribution because it will result in a minimum unbalance, and the workpiece can then be displaced accordingly.

Centering bores can be formed by means of machines having two gripping units, which are similar to backrests and serve to hold a workpiece, and two spindle units, which are disposed outside the gripping units and serve to drill or bore the centering bores. Such machines can be used in the method in accordance with the invention without a need for a high additional structural expenditure if, in accordance with the invention, the gripping units have chucks, which are adjustable in directions which are normal to the axis of the workpiece, and the mechanisms for adjusting each chuck are adapted to be controlled by a computer, which is connected to sensors, which are associated with respective workpiece portions which will not be machined and are directed to predetermined points of reference on said portions. It will then be sufficient for the workpiece which is to be balanced by being centered to be gripped by the gripping units initially in a zero position, in which the chucks are centered with respect to the spindle units. The external shapes of those portions of the actually existing workpiece which will not be machined are then detected by the sensors and the detected actual shapes are compared in the computer with the desired shapes of the ideal workpiece or the unbalance are computed from the actual shapes. The resulting deviation between the actual and desired shapes and the unbalance derived therefrom or the merely computed unbalances will then constitute the variables for the determination of the transverse displacement of the workpiece required for a balancing by centering. The data for the transverse displacement which are determined by the computer must be checked to find out whether they are within the limits which are defined by the overmeasures of material and ensure that the desired machining can be effected. In dependence on said data the adjusting mechanisms for the chucks are then controlled to effect a transverse displacement of the workpiece so as to correct the position of its axis of rotation and to balance the workpiece. After the proper transverse displacement of the workpiece the latter can be cut to length and can be formed in its end faces with the centering bores which define the axis of rotation of the workpiece. Now the workpiece has been balanced by being centered only in consideration of those workpiece portions which will remain unmachined rather than also in consideration of the workpiece portions which will subsequently be machined.

In accordance with a particularly preferred feature of the invention, tool-carrying units for machining the end portions of the workpiece are provided between each gripping unit and the adjacent spindle unit. In such a machine the workpiece cannot only be balanced by being centered but can also be cut to length and machined at its end portions without a need for re-chucking.

DETAILED DESCRIPTION OF THE PREFERRED EMBODIMENT

Figure 1:
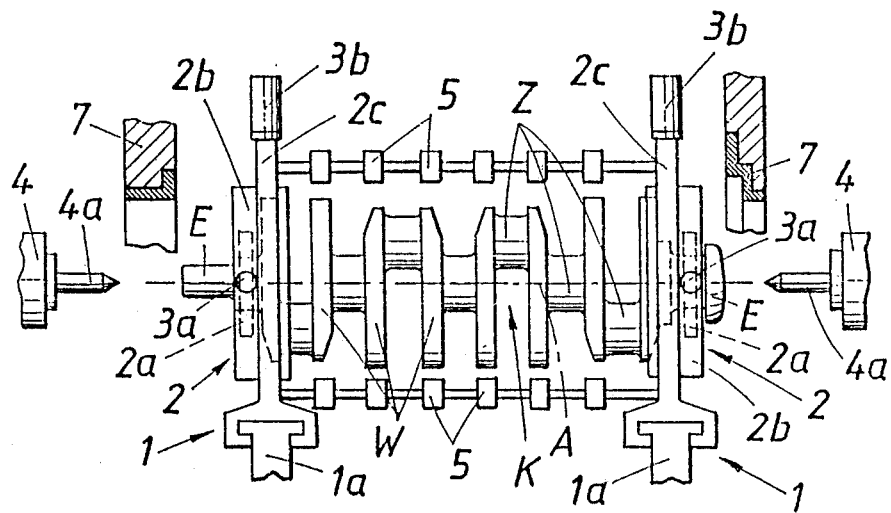
FIGS. 1 and 2 are, respectively, a side elevation and an end elevation showing a machine for a balancing centering of crankshafts, FIG. 2 including a diagram of the control circuit.
Figure 2:
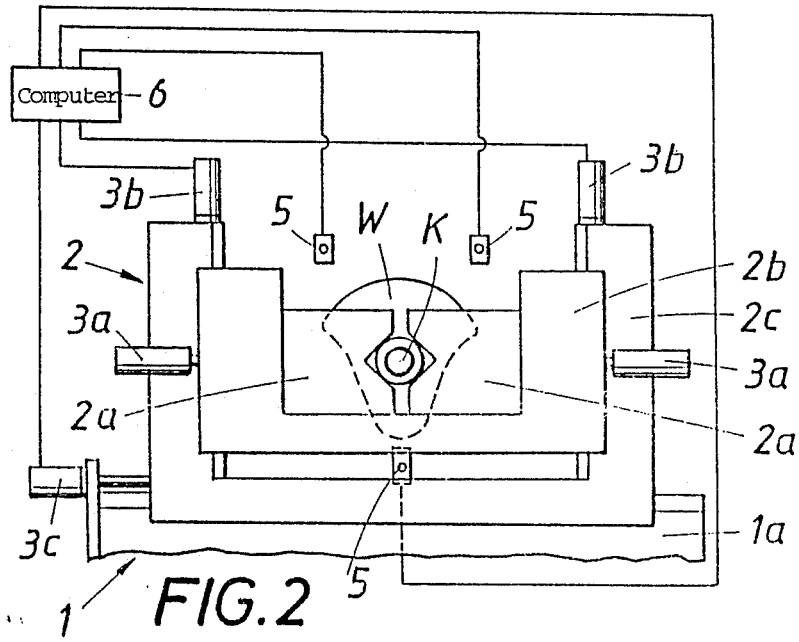

A crankshaft K, which is not to be machined at the peripheries of the crankwebs W and is to be finished by being machined only at the mainshaft portions, crankpins Z and at its end faces E, is subjected to a balancing operation after the crankshaft has been finished. This balancing operation is simplified and improved by prebalancing the crankshaft already as it is centered before it is machined. For that purpose the workpiece K is gripped at two portions, which are initially substantially concentric and coaxial, by two axially spaced apart gripping units 1 of an end machining machine, which is not shown in more detail. Each gripping unit 1 comprises a chuck 2, which is adjustable in a direction which is normal to an axis along which chucks 2 are initially aligned. Each chuck 2 may consist of a vertical slide $2b$, which carries the gripping jaws $2a$ and is vertically adjustably mounted in a cross slide $2c$, which is transversely slidably mounted on the backrest body $1a$. The associated adjusting mechanisms $3a$, $3b$, $3c$ are respectively associated with the gripping jaws $2a$, the vertical slide $2b$ and the cross slide, and are operable to chuck the workpiece K and to move it in any desired direction transversely to the axis of the workpiece.

For a balancing centering of the crankshaft K, the latter must be transversely displaced until the axis of rotation A, which is defined by the centering bores, is in such a position that the unbalance due to the mass distribution of the crankshaft K will be minimized. This balancing adjustment of the axis of rotation is effected by a proper transverse displacement of the crankshaft K before the spindle units 4 of the end machining machine are operated so that their drilling or boring tools $4a$ form bores in the end faces E of the workpiece so as to determine the actual axis of rotation A, which differs from the theoretical axis of rotation of the ideal workpiece. The extent and direction of the displacement of the workpiece will be determined only in consideration of those unbalances which are due to the workpiece portions which will not be machined, i.e., the crankwebs W, rather than also in consideration of those workpiece portions which will be machined, namely, the crankpins Z and the end faces E. It must be borne in mind that the unbalances which are due in the raw workpiece to said workpiece portions which will subsequently be machined will be eliminated as the workpiece is machined while it is centered on its axis of rotation A so that wrong results would be produced in the finished workpiece if the unbalances which are due to said subsequently machined portions were taken into account in the preliminary balancing centering operation.

To permit a measurement of those workpiece portions which will determine the transverse displacement and to permit the correcting displacement of the workpiece to be effected quickly, sensors 5 are associated with respective crankwebs and are aligned with selected individual points of reference on the surfaces of the crankwebs to measure the locations of said points of reference which are typical of the shape of the crankwebs. The measured values are fed into a computer 6, which derives the required transverse displacement from said measured values. This can be accomplished by a determination of the deviations between the actual shapes of the actual workpiece and the desired shapes of an ideal workpiece, or by a direct computation of that position of the axis of the workpiece which minimizes the unbalances. The computer will then control the adjusting mechanisms $3b$, $3c$ associated with the backrests 1 in such a manner that the crankshaft K will be transversely displaced to the required extent in the required direction. After the balancing adjustment of the crankshaft K, it is cut to length at its end portions E by a planing its end faces. For cutting the workpiece to length, a reference surface, e.g., a web surface, is defined by means not shown in more detail and the cutting to length can then also be controlled by the computer. Thereafter the spindle units can be operated to form the centering bores so that the crankshaft K has been centered in a balanced state.

Additional finishing tool-carrying units 7, which are merely diagrammatically indicated, may be provided between each spindle unit 4 and the adjacent backrest 1 and may consist, of an inserted-tooth cutter having cutting edges corresponding to the desired profile of the end portions E of the workpiece. In that case the end machining tool can be used not only for the balancing centering and for the machining of the end faces but also for finishing the shaft and flange portions of the end portions E of the crankshaft.

I claim:

1. A method for a balancing centering of a workpiece having first portions to be machined and second portions which are not to be machined along an axis of the workpiece, the workpiece portions imparting unbalances to the workpiece with respect to the axis, the method comprising the steps of
    (a) gripping the unbalanced workpiece,
    (b) imparting a transverse displacement to the gripped workpiece with respect to the axis to reduce the unbalance of the workpiece,
    (c) cutting the gripped workpiece to length in the position resulting from the transverse displacement along two opposite end faces, and
    (d) forming a respective centering bore in each end face of the gripped workpiece in the position resulting from the transverse displacement, the centering bores defining an axis of rotation for the balanced workpiece,
    (e) wherein the improvement comprises the steps of
        (1) measuring only the unbalances of said second workpiece portions while disregarding the unbalances of said first workpiece portions to obtain corresponding measured data and
        (2) determining the extent and direction of the transverse displacement only in response to, and on the basis of, said measured data.

2. The method of claim 1, wherein the unbalances of the second workpiece portions are measured by sensing at least selected individual points of reference defining the external shapes of the second workpiece portions.

3. The method of claim 2, comprising the further steps of feeding the measured data into a computer in which data representing desired external shapes of the second workpiece portions are stored, comparing the measured and the stored data in the computer to determine any deviation of the measured data from the stored data, and determining the extent and direction of the transverse displacement in response to, and on the basis of, said deviation.

4. A machine for a balancing centering of a workpiece having first portions to be machined and second portions which are not to be machined along an axis of the workpiece, the workpiece portions imparting unbalances to the workpiece with respect to the axis, the machine comprising the combination of
    (a) means for gripping the unbalanced workpiece,
    (b) means for imparting a transverse displacement to the gripped workpiece with respect to the axis to reduce the unbalance of the workpiece,
    (c) means for cutting the gripped workpiece to length in the position resulting from the transverse displacement along two opposite end faces, and
    (d) two spindle units spaced apart along, and aligned with, a predetermined axis, each spindle unit being operable to form a respective centering bore in each end face of the gripped workpiece in the position resulting from the transverse displacement, the centering bores defining an axis of rotation for the balanced workpiece,
        (1) the gripping means comprising two backrest-like gripping units disposed between the spindle units and spaced apart along said workpiece axis,
    (e) wherein the improvement comprises
        (1) a chuck in each gripping unit for gripping an adjacent portion of the workpiece,
        (2) adjusting means for adjusting each chuck in a direction normal to the predetermined axis whereby the transverse displacement is imparted to the gripped adjacent workpiece portion,
        (3) a plurality of sensors associated only with selected points of reference on the second workpiece portions for measuring the unbalances of said second workpiece portions while disregarding the unbalances of said first workpiece portions, the sensor generating corresponding measured data, and
        (2) a computer in which data representing points of reference on the second workpiece portions of an ideal workpiece are stored, the computer having an input receiving the measured data, means for comparing the measured and the stored data to determine any deviation of the measured data from the stored data, and an output generating data corresponding to the deviation, the output data determining the extent and direction of the transverse displacement in response to, and on the basis of, said deviation.

5. The machine of claim 4, further comprising a tool unit between each spindle unit and gripping unit for machining the workpiece.

* * * * *